(12) United States Patent
Matsutani

(10) Patent No.: US 7,499,089 B2
(45) Date of Patent: Mar. 3, 2009

(54) COLOR INTERPOLATION METHOD IN BAYER ARRAY

(75) Inventor: Takashi Matsutani, Osaka (JP)

(73) Assignee: Mega Chips LSI Solutions Inc., Osaka-shi (JP)

( * ) Notice: Subject to any disclaimer, the term of this patent is extended or adjusted under 35 U.S.C. 154(b) by 531 days.

(21) Appl. No.: 10/990,539

(22) Filed: Nov. 18, 2004

(65) Prior Publication Data

US 2005/0117040 A1 Jun. 2, 2005

(30) Foreign Application Priority Data

Nov. 28, 2003 (JP) .............................. 2003-398753

(51) Int. Cl.
*H04N 3/14* (2006.01)
*H04N 5/335* (2006.01)
*H04N 9/04* (2006.01)
*H04N 9/083* (2006.01)
*G06K 9/00* (2006.01)

(52) U.S. Cl. .................. 348/273; 348/280; 382/167

(58) Field of Classification Search .............. 348/272, 348/273; 382/162, 167
See application file for complete search history.

(56) References Cited

U.S. PATENT DOCUMENTS 7,231,084 B2 * 6/2007 Tang et al. ................... 382/162

2004/0075755 A1 * 4/2004 Rantanen et al. ......... 348/231.99
2004/0218073 A1 * 11/2004 Kalevo et al. ................ 348/272
2005/0073591 A1 * 4/2005 Ishiga et al. ............... 348/223.1
2005/0117040 A1 6/2005 Matsutani

FOREIGN PATENT DOCUMENTS

JP 11-205808 7/1999
JP 2002-300590 10/2002

OTHER PUBLICATIONS

U.S. Appl. No. 11/275,009, filed Dec. 1, 2005, Hasegawa.

* cited by examiner

*Primary Examiner*—Ngoc-Yen T Vu
*Assistant Examiner*—Chia-Wei A Chen
(74) *Attorney, Agent, or Firm*—Oblon, Spivak, McClelland, Maier & Neustadt, P.C.

(57) ABSTRACT

A sensor such as a CCD image pickup device is equipped with a color filter of RGB Bayer array. An image is read from such a sensor (S1) and inputted to a color interpolation device as raw data (S2). The color interpolation device calculates additional values DH and DV of differential absolute values of pixel values in a horizontal direction and a vertical direction by using pixels of all colors in a peripheral area of a specified pixel (S3 and S4). The additional values DH and DV are compared with each other (S5) and when it is judged that there is a tendency of pixel drift in the horizontal direction or the vertical direction, S6 is executed. In S6, when a correlation in the vertical direction is strong, an interpolation using vertical adjacent pixels is performed and when a correlation in the horizontal direction is strong, an interpolation using horizontal adjacent pixels is performed. By this method, it is possible to improve the accuracy of color interpolation.

7 Claims, 4 Drawing Sheets

F I G . 1
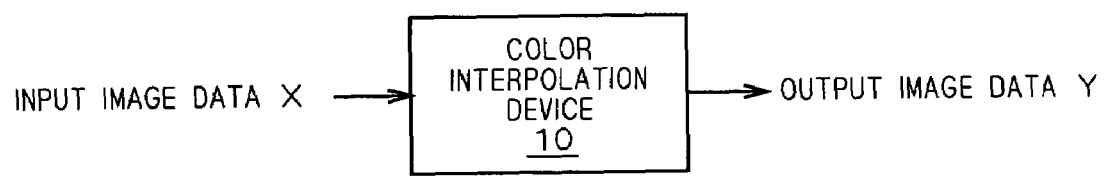
F I G . 2
| G | R | G | R | G |
|---|---|---|---|---|
| B | G | B | G | B |
| G | R | G | R | G |
| B | G | B | G | B |
| G | R | G | R | G |
RGB COLOR FILTER ARRAY FIG. 4
| Q00 | Q01 | Q02 | Q03 | Q04 |
| Q10 | Q11 | Q12 | Q13 | Q14 |
| Q20 | Q21 | Q22 | Q23 | Q24 |
| Q30 | Q31 | Q32 | Q33 | Q34 |
| Q40 | Q41 | Q42 | Q43 | Q44 |
FIG. 5
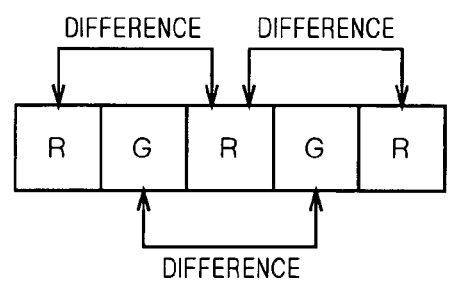
FIG. 6
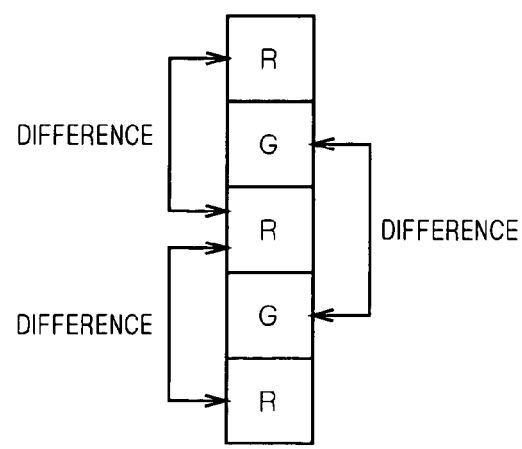

COLOR INTERPOLATION METHOD IN BAYER ARRAY

BACKGROUND OF THE INVENTION

1. Field of the Invention

The present invention relates to a method of performing color interpolation of image data.

2. Description of the Background Art

A CCD image pickup device used in a digital camera or the like performs photoelectric conversion of light received through a color filter and outputs image data. As this color filter, an RGB color filter, a YMCK color filter or the like is used. Through a 1-chip color CCD, image data of one color is outputted for one pixel. For example, through an RGB color filter, image data of R (Red) component, G (Green) component or B (Blue) component is outputted for one pixel.

With respect to image data outputted from a 1-chip color CCD, since only image data of one single color is outputted for each pixel, interpolation is performed on image data of the other color components. For this interpolation, various algorithms are used.

The interpolation, however, is an operation of estimating image data of a specified pixel from image data of pixels around the specified pixel, and therefore a wrong interpolation is sometimes performed depending on the content of an image. Then, techniques to improve the accuracy of interpolation are disclosed in the following Laid Open Gazettes.

Japanese Patent Application Laid Open Gazette No. 2002-300590 discloses a technique where correlations in vertical and horizontal directions are obtained by calculating the difference of G signals in the vertical direction and that of G signals in the horizontal direction and pixel interpolation and generation of a color difference signal are performed in accordance with the correlations. Japanese Patent Application Laid Open Gazette No. 11-205808 discloses a technique where the correlations in the vertical and horizontal directions are obtained by using G signals and pixel interpolation is performed in accordance with the correlations.

Since the correlations are obtained only by using the G signals in the methods disclosed in the above Laid Open Gazettes, however, these methods have a problem in accuracy of interpolation. Since the correlation in the horizontal or vertical direction is conventionally judged from adjacent pixels (in a narrow area), this causes errors in judgment of correlation in a high frequency range such as an edge portion or a fine line (especially, an area near Nyquist frequency or an area of fine line across pixels). For this reason, there is a problem that the accuracy of interpolation is low when the tendency of pixel drift in either the horizontal or vertical direction is strong.

SUMMARY OF THE INVENTION

The present invention is intended for a color interpolation method.

According to an aspect of the present invention, the color interpolation method comprises a first step of inputting pixel data of Bayer array in a predetermined color space, a second step of setting a predetermined area around a specified pixel and calculating a pixel-value change evaluation value in a horizontal direction (hereinafter, referred to as a horizontal evaluation value) and a pixel-value change evaluation value in a vertical direction (hereinafter, referred to as a vertical evaluation value) by using pixel data of all color components in the predetermined area, a third step of comparing the horizontal evaluation value and the vertical evaluation value, and a fourth step of performing pixel interpolation using pixel values in the vertical direction about the specified pixel when it is judged from a comparison of the third step that a pixel value change in the horizontal direction is larger or performing pixel interpolation using pixel values in the horizontal direction about the specified pixel when it is judged that a pixel value change in the vertical direction is larger.

In the present invention, since all the color components contribute to the judgment for the interpolation, it is possible to perform an interpolation with higher accuracy.

According to another aspect of the present invention, the third step includes the step of judging whether the difference between the horizontal evaluation value and the vertical evaluation value exceeds a predetermined threshold value or not, and the fourth step is performed only when the difference between the horizontal evaluation value and the vertical evaluation value exceeds the predetermined threshold value in the third step.

By this method, when there is no evaluable correlation in the horizontal direction or the vertical direction, it is possible to avoid performing a wrong interpolation.

Therefore, it is an object of the present invention to provide a technique to improve the accuracy of interpolation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a color interpolation device and input/output data;

FIG. 2 is a view showing a color filter array of RGB Bayer array;

FIG. 4 is a view showing pixel values of 5×5 around a specified pixel;

FIG. 5 is a view showing a manner of taking differences in a horizontal direction;

FIG. 6 is a view showing a manner of taking differences in a vertical direction.

DESCRIPTION OF THE PREFERRED EMBODIMENTS

Hereinafter, the preferred embodiment of the present invention will be discussed, referring to figures. As shown in FIG. 1, a color interpolation device 10 performs color interpolation on input image data X and outputs color-interpolated output image data Y.

The input image data X is, e.g., data picked up by a CCD image pickup device used in a digital camera. In this preferred embodiment, it is assumed that the CCD image pickup device is a 1-chip CCD having a color filter of RGB Bayer array as shown in FIG. 2. In the RGB Bayer array, G (Green) filters are arranged in a checkered pattern and R (Red) filters and B (Blue) filters are arranged alternately by lines. Therefore, the input image data X is data having a pixel value of any one color of R (Red) component, G (Green) component and B (Blue) component for one pixel. Such input image data X is inputted to the color interpolation device 10 in an order of colors, e.g., G, R, G, R . . . or B, G, B, G . . . or the like.

Figure 3:
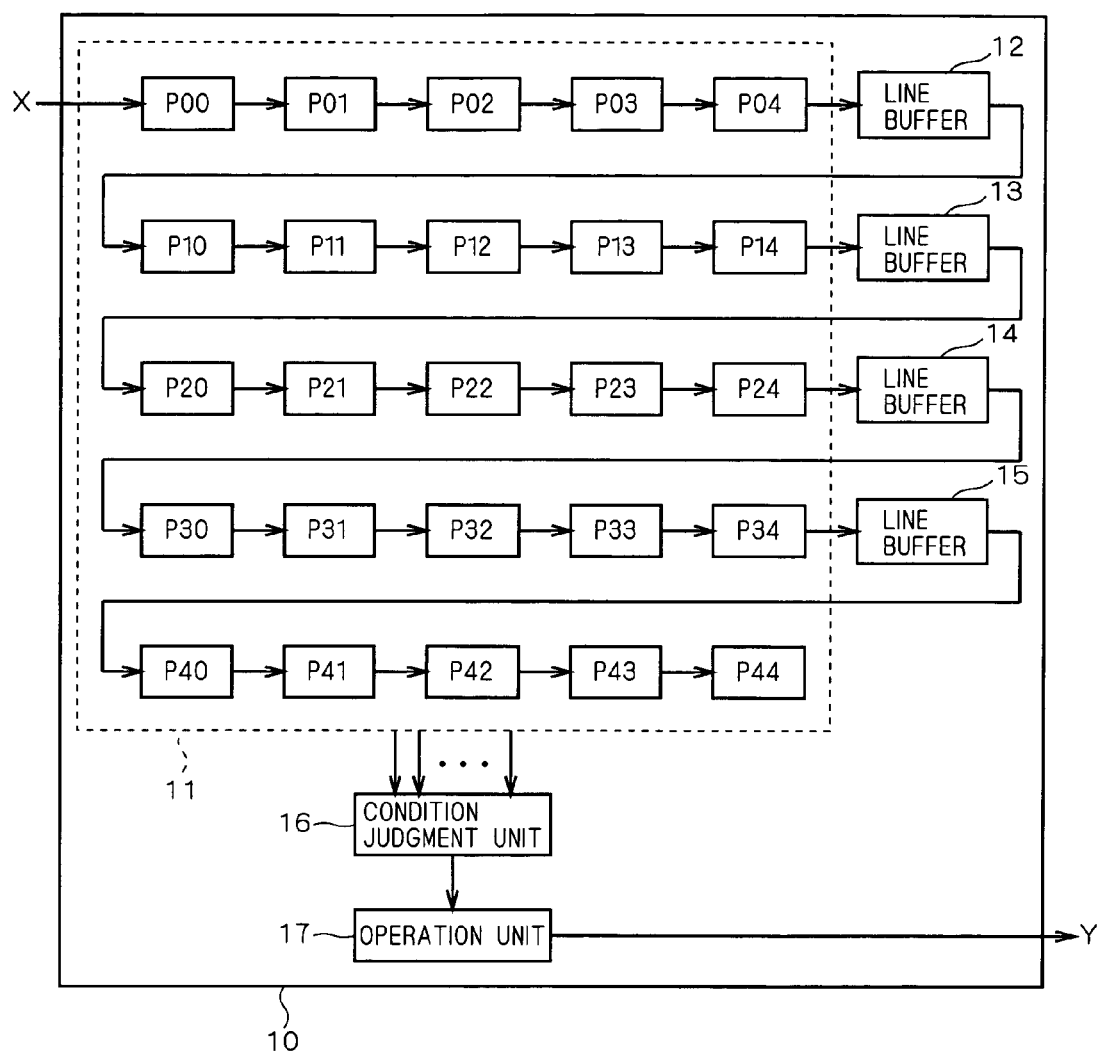
FIG. 3 is a functional block diagram showing the color interpolation device.

FIG. 3 is a functional block diagram showing the color interpolation device 10. The color interpolation device 10 comprises a group of registers 11, line buffers 12, 13, 14 and 15, a condition judgment unit 16 and an operation unit 17. The condition judgment unit 16 and the operation unit 17 have equivalent constitutions constituted of, e.g., a CPU and a memory storing a program defining an operation of the CPU.

The group of registers 11 comprises twenty-five (5×5) registers P00, P01, . . . P44, as shown in FIG. 3. More specifically, five registers P00 to P04 are connected in series to one another and a line buffer 12 is connected to a lower side of the last register P04. Further, in a downstream (lower side) of the line buffer 12, five registers P10 to P14 are connected in series thereto and the line buffer 13 is connected to a lower side of the last register P14. Further, in a downstream of the line buffer 13, five registers P20 to P24 are connected in series thereto and the line buffer 14 is connected to a lower side of the last register P24 and in a downstream (lower side) of the line buffer 14, five registers P30 to P34 are connected in series thereto and the line buffer 15 is connected to a lower side of the last register P34. Finally, in a downstream (lower side) of the line buffer 15, five registers P40 to P44 are connected in series thereto.

To the group of registers 11, pixel values of the input image data X are sequentially inputted along a direction of pixel arrangement (direction of scan line). The respective pixel values stored in the registers P00 to P43 are transmitted to the respective lower-side registers P01 to P44 every one clock and stored therein. The pixel values passing through the group of registers 11 go by way of the line buffers 12 to 15. If the input image data X inputted to the color interpolation device 10 is image data of N pixels in a horizontal direction, for example, the line buffers 12 to 15 serve as a line buffer for storing image data of (N-5) pixels. Specifically, the line buffers 12 to 15 receive the data of pixels outputted from the registers P04, P14, P24 and P34, then hold the image data for (N-4) clocks and output the pixel data to the respective next-stage registers P10, P20, P30 and P40 at (N-5) clock. As a result, the group of registers 11 holds two-dimensional pixel value (5×5 pixels) around a specified pixel. In this case, the specified pixel is a pixel corresponding to the register P22.

Assuming that the pixel values stored in the registers P00, P02, . . . P44 are Q00, Q01, . . . Q44, the group of registers 11 stores the two-dimensional image data as shown in FIG. 4. Specifically, the pixel value of the specified pixel before interpolation is Q22.

When the input image data X is sequentially inputted to the color interpolation device 10 on a pixel-by-pixel basis, the pixel values Q00, Q01, . . . Q44 of the 5×5 pixels shown in FIG. 4 are stored in the registers P00, P01, . . . P44, respectively, as pixel values of peripheral pixels of the specified pixel. Then, every time when the specified pixel is updated, the condition judgment unit 16 inputs the pixel values Q00, Q01, . . . Q44 of the peripheral pixels stored in the registers P00, P01, . . . P44.

The condition judgment unit 16 calculates an additional value of differential absolute values of pixel values on the basis of the pixel values Q00, Q01, . . . Q44 for each of the horizontal direction and the vertical direction. This is an operation for obtaining the tendency of pixel drift in the horizontal and vertical directions about the current specified pixel. The tendency of pixel drift indicates the correlation of the pixel values, and for example, when there are straight lines or stripes in the horizontal direction, it is said that there is a tendency of horizontal drift of pixels. When there is a tendency of horizontal drift of pixels, the correlation in the horizontal direction is high.

The difference of pixel values in the horizontal direction is a difference between values of pixels of the same color which appear every other pixel as shown in FIG. 5. For example, when a horizontal line is a row of pixels R, G, R, G, R . . . , both differences of pixel values for the G component and the R component are calculated. Similarly, when a horizontal line is a row of pixels B, G, B, G, B . . . , both differences of pixel values for the G component and the B component are calculated.

Eq. 1 is an equation of a pixel-value change evaluation value DH in the horizontal direction, i.e., an additional value of differential absolute values of pixel values in the horizontal direction, where abs (x) represents an absolute value of x.

$$DH = abs(Q00 - Q02) + abs(Q01 - Q03) + abs(Q02 - Q04) + \qquad \text{(Eq. 1)}$$
$$abs(Q10 - Q12) + abs(Q11 - Q13) + abs(Q12 - Q14) +$$
$$abs(Q20 - Q22) + abs(Q21 - Q23) + abs(Q22 - Q24) +$$
$$abs(Q30 - Q32) + abs(Q31 - Q33) + abs(Q32 - Q34) +$$
$$abs(Q40 - Q42) + abs(Q41 - Q43) + abs(Q42 - Q44)$$

Eq. 2 is an equation of a pixel-value change evaluation value DV in the vertical direction, i.e., an additional value of differential absolute values of pixel values in the vertical direction, where abs (x) represents an absolute value of x.

$$DH = abs(Q00 - Q20) + abs(Q10 - Q30) + abs(Q20 - Q40) + \qquad \text{(Eq. 2)}$$
$$abs(Q01 - Q21) + abs(Q11 - Q31) + abs(Q21 - Q41) +$$
$$abs(Q02 - Q22) + abs(Q12 - Q32) + abs(Q22 - Q42) +$$
$$abs(Q03 - Q23) + abs(Q13 - Q33) + abs(Q23 - Q43) +$$
$$abs(Q04 - Q24) + abs(Q14 - Q34) + abs(Q24 - Q44)$$

The pixel-value change evaluation values DH and DV are values obtained by adding up the differential absolute values of the same color pixels arranged every other pixel in an area of the peripheral pixels of 5×5 as shown in FIG. 4 in the horizontal direction and the vertical direction, respectively. These evaluation values DH and DV add up the differential absolute values of all color components of R, G and B.

Next, the condition judgment unit 16 calculates a differential absolute value abs (DH−DV) between the pixel-value change evaluation value DH of the horizontal direction and the pixel-value change evaluation value DV of the vertical direction and judges whether Eq. 3 is satisfied or not.

$$abs(DH-DV) \geq DA \qquad \text{(Eq. 3)}$$

where DA represents a threshold value for judging the tendency of pixel drift in the horizontal direction or the vertical direction. When the difference between the pixel-value change evaluation value DH in the horizontal direction and the pixel-value change evaluation value DV in the vertical direction is not too much large and the differential absolute value is smaller than the threshold value DA, it is judged that there is no tendency of pixel drift in the horizontal direction or the vertical direction, in other words, it is judged that there is no evaluable correlation in either the horizontal direction or the vertical direction and the interpolation of the present invention is not needed. On the other hand, when the differential absolute value is larger than the threshold value DA, it is judged that there is a tendency of pixel drift in the horizontal direction or the vertical direction, in other words, it is judged that there is an evaluable correlation in either the horizontal direction or the vertical direction and the interpolation of the present invention is needed.

The condition judgment unit 16 informs the operation unit 17 of the judgment result on the correlation. In accordance with this result, the operation unit 17 performs an interpolating operation. Specifically, when the condition judgment unit 16 judges that Eq. 3 is satisfied, in other words, when it is judged that there is an evaluable correlation in either the horizontal direction or the vertical direction, the operation unit 17 performs such an interpolating operation as shown in Eq. 4.

$$Qi22 = \frac{Q12 + Q32}{2} \quad (DH > DV)$$
$$Qi22 = \frac{Q21 + Q23}{2} \quad (DH < DV)$$
Eq. 4 where Qi22 represents an interpolated pixel value about the specified pixel. When DH>DV, in other words, when the correlation in the vertical direction is larger, an average value of the vertical adjacent pixel values Q12 and Q32 of the specified pixel is adopted as a pixel value of the specified pixel. When DH<DV, in other words, when the correlation in the horizontal direction is larger, an average value of the horizontal adjacent pixel values Q21 and Q23 of the specified pixel is adopted as a pixel value of the specified pixel.

As shown in Eq. 4, the interpolation is performed by using the vertical or horizontal adjacent pixel values. Accordingly, when the input image data X is image data of RGB Bayer array as shown in FIG. 2, the image data of G component can be subjected to the interpolation. Therefore, in the preferred embodiment, the color interpolation device 10 performs interpolation of the image data of G component.

Depending on the arrangement of the color filters, however, the color interpolation can be performed on the other color components, i.e., R component and B component, by applying the algorithm of the present invention. Specifically, the characteristic feature of the color interpolation algorithm of the present invention lies in that for judging the tendency of pixel drift in the horizontal direction or the vertical direction, i.e., for judging the correlation, the pixel-value change evaluation values DH and DV are calculated by using the pixel values of all the color components in a color space. As far as the pixel-value change evaluation values DH and DV are used as judgment references, these values may be applied to the interpolating operations for the R component and the B component as well as the G component.

Though the input image data X is image data in the RGB color space in the above-discussed preferred embodiment, the algorithm of the present invention can be applied to a case where the input image data is data in other color spaces. Further, though the pixel-value change evaluation values DH and DV are obtained by using the 5×5 pixels around the specified pixel in the above-discussed preferred embodiment, an area of the peripheral pixels used for calculation of the pixel-value change evaluation values DH and DV is not particularly limited but a peripheral area of 7×7 pixels may be used.

Figure 7:
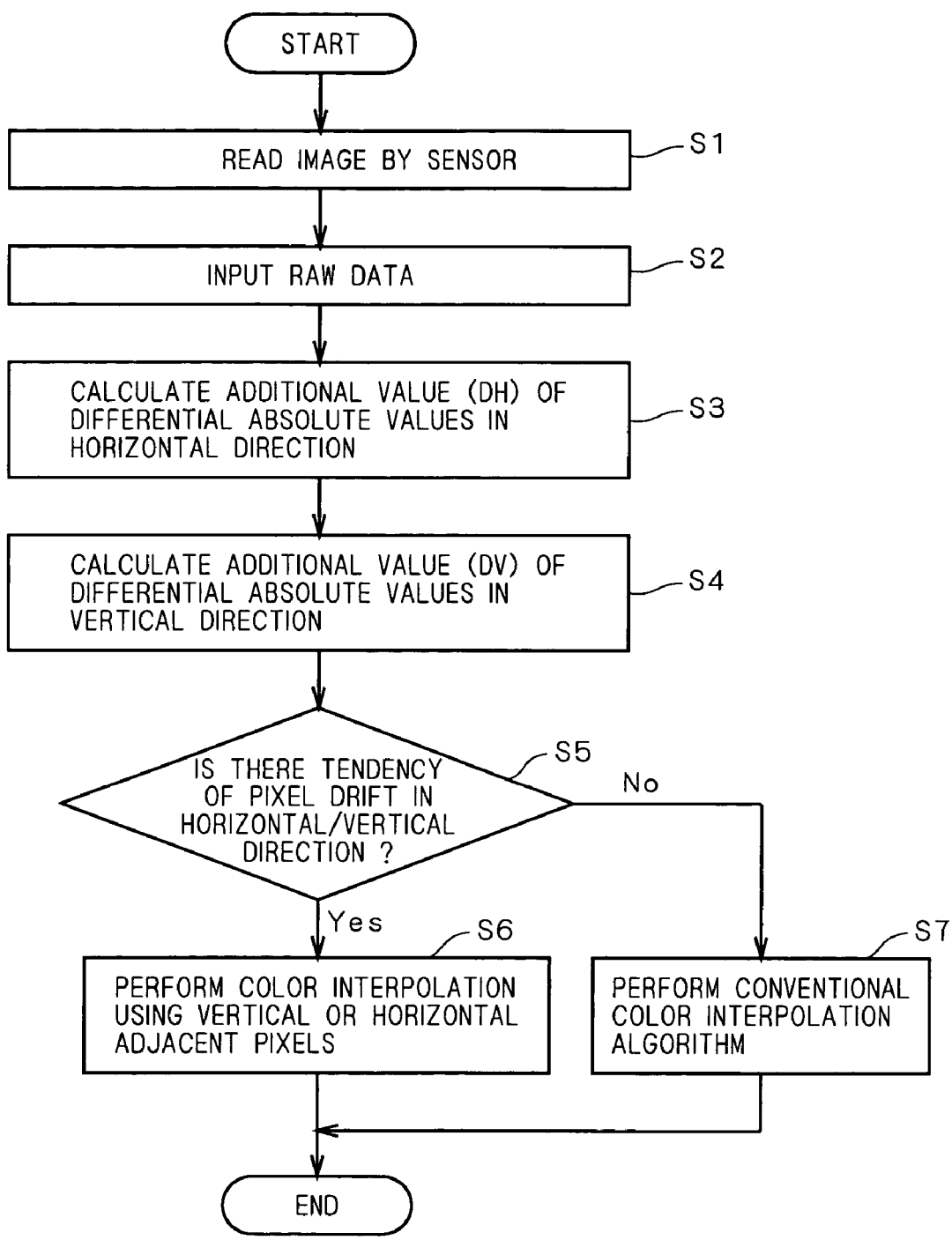
FIG. 7 is a flowchart showing color interpolation algorithm of the present invention.

FIG. 7 is a flowchart showing the color interpolation algorithm of the present invention. First, a sensor such as a CCD image pickup device reads an image (Step S1). Next, the color interpolation device 10 inputs the input image data X as raw data (Step S2). Subsequently, the color interpolation device 10 calculates an additional value of the differential absolute values in the horizontal direction (the pixel-value change evaluation value DH in the horizontal direction) and an additional value of the differential absolute values in the vertical direction (the pixel-value change evaluation value DV in the vertical direction) (Steps S3 and S4).

Next, the condition judgment unit 16 judges whether there is a tendency of pixel drift in the horizontal direction or the vertical direction or not (Step S5). In this judgment, whether Eq. 3 is satisfied is judged.

When it is judged that there is a tendency of pixel drift in the horizontal direction or the vertical direction, in other words, when it is judged that there is an evaluable correlation in either the horizontal direction or the vertical direction (YES in Step S5), such an interpolation as shown in Eq. 4 is performed (Step S6).

On the other hand, when it is judged that there is no tendency of pixel drift in the horizontal direction or the vertical direction, in other words, when it is judged that there is no evaluable correlation in either the horizontal direction or the vertical direction (NO in Step S5), other well-known interpolation is performed since the interpolation of Eq. 4 is not appropriate. Among other interpolations is, for example, a method using an average value of the vertical and horizontal adjacent four pixels as a pixel value of the specified pixel. Further, an interpolating operation disclosed in Japanese Patent Application Laid Open Gazette No. 11-225056 and the like, which is applied by the present applicant, may be performed.

Thus, when the relation between the pixel-value change evaluation values DH and DV does not satisfy Eq. 3, the interpolation of Eq. 4 is not performed for the following reason. The interpolation algorithm of the present invention is used for performing an interpolation when there is a correlation in the horizontal direction or the vertical direction, in consideration of the correlation. Accordingly, the interpolation adopts biased data as compared with, e.g., the interpolation using the vertical and horizontal adjacent four pixels. Therefore, especially when there is no correlation in either the horizontal direction or the vertical direction, the interpolation of Eq. 4 is not performed and the interpolation using the conventional algorithm is adopted.

While the invention has been shown and described in detail, the foregoing description is in all aspects illustrative and not restrictive. It is therefore understood that numerous modifications and variations can be devised without departing from the scope of the invention.

What is claimed is:

1. A color interpolation method of performing a color interpolation about a specified pixel in a Bayer array, comprising:

inputting pixel data of the Bayer array in a predetermined color space;

setting a two-dimensional matrix as a predetermined area around said specified pixel and calculating a horizontal evaluation value that is a pixel-value change evaluation value in a horizontal direction, and a vertical evaluation value that is a pixel-value change evaluation value in a vertical direction, by using all the pixel data of all color components in said predetermined area, the predetermined area being a pixel area of at least 5×5 around said specified pixel;

comparing said horizontal evaluation value and said vertical evaluation value; and performing pixel interpolation using pixel values in said vertical direction about said specified pixel when it is judged from the comparing that a pixel value change in said horizontal direction is larger or performing pixel interpolation using pixel values in said horizontal direction about said specified pixel when it is judged from the comparing that a pixel value change in said vertical direction is larger.

2. The color interpolation method according to claim 1, wherein the comparing includes comparing said horizontal evaluation value that is a value obtained by adding up all differential absolute values of pixel values of the same color pixel data which are adjacent to one another in said horizontal direction in said predetermined area, and said vertical evaluation value that is a value obtained by adding up all differential absolute values of pixel values of the same color pixel data which are adjacent to one another in said vertical direction in said predetermined area.

3. The color interpolation method according to claim 1, wherein
said comparing includes judging whether a difference between said horizontal evaluation value and said vertical evaluation value exceeds a predetermined threshold value or not, and
said performing is performed only when said difference between said horizontal evaluation value and said vertical evaluation value exceeds said predetermined threshold value in said comparing.

4. The color interpolation method according to claim 1, wherein
assuming that a color which is arranged in a checkered pattern in said Bayer array is a first color component, said specified pixel is a second color component other than said first color component, and
said performing includes performing pixel interpolation of said first color component on said specified pixel by using pixel values of two pixel data of said first color component which are vertically adjacent to said specified pixel when it is judged that said pixel value change in said horizontal direction is larger and performing pixel interpolation of said first color component on said specified pixel by using pixel values of the two pixel data of said first color component which are horizontally adjacent to said specified pixel when it is judged that said pixel value change in said vertical direction is larger.

5. The color interpolation method according to claim 4, wherein
said predetermined color space is an RGB color space and said first color component is a G component.

6. The color interpolation method according to claim 1, wherein
the calculating comprises calculating the horizontal evaluation value based on absolute values of differences between pairs of pixels of the same color in the horizontal direction for each of the color components in said predetermined area, and calculating the vertical evaluation value based on absolute values of differences between pairs of pixels of the same color in the vertical direction for each of the color components in said predetermined area.

7. The color interpolation method according to claim 1, wherein
setting the two-dimensional matrix as the predetermined area around said specified pixel comprises setting a two-dimensional equilateral matrix as the predetermined area around said specified pixel.

* * * * *